(12) United States Patent
Heckmeier et al.

(10) Patent No.: US 6,638,581 B2
(45) Date of Patent: *Oct. 28, 2003

(54) LIQUID-CRYSTAL MEDIUM, AND ELECTRO-OPTICAL DISPLAY CONTAINING THE MEDIUM

(75) Inventors: Michael Heckmeier, Bensheim (DE); Dagmar Klement, Gross-Zimmern (DE); Matthias Bremer, Darmstadt (DE)

(73) Assignee: Merck Patent Gesellschaft mit, Darmstadt (DE)

( * ) Notice: Subject to any disclaimer, the term of this patent is extended or adjusted under 35 U.S.C. 154(b) by 41 days.

This patent is subject to a terminal disclaimer.

(21) Appl. No.: 09/816,661

(22) Filed: Mar. 26, 2001

(65) Prior Publication Data

US 2002/0084443 A1 Jul. 4, 2002

(30) Foreign Application Priority Data

Mar. 24, 2000 (DE) .......................... 100 14 882

(51) Int. Cl.$^7$ .................. C09K 19/34; C09K 19/30; C09K 19/12
(52) U.S. Cl. .............. 428/1.1; 252/299.61; 252/299.63; 252/299.66
(58) Field of Search ....................... 428/1.1; 252/299.61, 252/299.63, 299.66

(56) References Cited

U.S. PATENT DOCUMENTS 6,066,268 A * 5/2000 Ichinose et al. ....... 252/299.63
6,217,953 B1 * 4/2001 Heckmeier et al. .......... 428/1.1
6,348,244 B1 * 2/2002 Miyazawa et al. ........... 428/1.1
6,376,030 B1 * 4/2002 Heckmeier et al. .......... 428/1.1
6,514,580 B2 * 2/2003 Heckmeier et al. .......... 428/1.1

FOREIGN PATENT DOCUMENTS

GB 2323603 A * 9/1998

* cited by examiner

*Primary Examiner*—Shean C. Wu
(74) *Attorney, Agent, or Firm*—Millen, White, Zelano & Branigan, P.C.

(57) ABSTRACT

A liquid-crystal medium comprising a) at least one compound of the formula I and b) at least one compound of the formula II

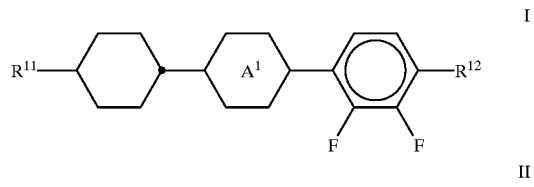

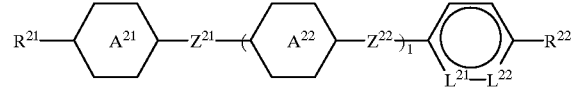

wherein $R^{11}, R^{12}, R^{21}, R^{22}, A^1, A^{21}, Z^{21}, Z^{22}, L^{21}, L^{22}$ and I are as defined herein are suitable for use in ECB, VAN, IPS, GH and ASM-PA LCD displays.

35 Claims, No Drawings

LIQUID-CRYSTAL MEDIUM, AND ELECTRO-OPTICAL DISPLAY CONTAINING THE MEDIUM

The present invention relates to liquid-crystal displays, in particular to active matrix-addressed liquid-crystal displays (AMDs or AMLCDs), especially those which use an active matrix of thin-film transistors (TFTs) or varistors. In addition, the present application relates to liquid-crystal media for use in such displays. Such AMDs can use various active electronic switching elements. The most widespread are displays using three-pole switching elements. These are also preferred in the present invention. Examples of such three-pole switching elements are MOS (metal oxide silicon) transistors or the above-mentioned TFTs or varistors. In the case of TFTs, various semiconductor materials, predominantly silicon or cadmium selenide, are used. In particular, polycrystalline silicon or amorphous silicon is used. In contrast to the three-pole electronic switching elements, matrices of 2-pole switching elements, such as, for example, MIM (metal insulator metal) diodes, ring diodes or back-to-back diodes, can be employed in AMDs. However, these are, as also explained in greater detail below, usually not preferred owing to the inferior electro-optical properties achieved by the AMDs.

In liquid-crystal displays of this type, the liquid crystals are used as dielectrics whose optical properties change reversibly on application of an electric voltage. Electro-optical displays which use liquid crystals as media are known to the person skilled in the art. These liquid-crystal displays use various electro-optical effects. The most common conventional displays use the TN effect (twisted nematic, having a nematic structure which is twisted by about 90°), the STN effect (supertwisted nematic) or the SBE effect (supertwisted birefringence effect). In these and similar electro-optical effects, liquid-crystalline media of positive dielectric anisotropy ($\Delta\epsilon$) are used.

Since the operating voltage should be kept as low as possible in displays in general, including in displays using these effects, use is made of liquid-crystal media of large dielectric anisotropy which are generally composed predominantly of dielectrically positive liquid-crystal compounds and contain at most smaller/lower proportions of dielectrically neutral compounds.

In contrast to the above-mentioned conventional displays using the above-mentioned electro-optical effects which require liquid-crystal media of positive dielectric anisotropy, there are other electro-optical effects which use liquid-crystal media of negative dielectric anisotropy, such as, for example, the ECB effect (electrically controlled birefringence) and its sub-forms DAP (deformation of aligned phases), VAN (vertically aligned nematics) and CSH (colour super homeotropics). The present invention relates to these effects.

The IPS effect (in-plane switching), which has been increasingly used recently, can use both dielectrically positive and dielectrically negative liquid-crystal media, similarly to guest/host displays, which, depending on the display mode used, can use dyes either in dielectrically positive or in dielectrically negative media. Here too, the present invention relates to those liquid-crystal displays mentioned in this paragraph which use dielectrically negative liquid-crystal media.

A further promising type of liquid-cyrstal display are axially symmetric microdomain (ASM) displays which are preferably addressed by means of plasma arrays (PA LCDs= plasma addressed liquid crystal displays). The present invention also relates to these displays.

The liquid-crystal media employed in the above-mentioned liquid-crystal displays and all liquid-crystal displays utilizing similar effects generally consist predominantly and usually even very substantially of liquid-crystal compounds having the corresponding dielectric anisotropy, i.e. compounds of positive dielectric anisotropy in the case of dielectrically positive media and compounds of negative dielectric anisotropy in the case of dielectrically negative media.

In the media used according to the present application, use can be made of at best significant amounts of dielectrically neutral liquid-crystal compounds, and usually of only very small amounts of dielectrically positive compounds or no dielectrically positive compounds at all, since in general the liquid-crystal displays must have the lowest possible addressing voltages. For this reason, liquid-crystal compounds having a dielectric anisotropy which is opposite in sign to the dielectric anisotropy of the medium are generally employed extremely sparingly or not at all.

The liquid-crystal media of the prior art have relatively poor low-temperature stabilities. Thus, the nematic phases frequently extend only down to −20° C. and in some cases even only down to −10° C. In addition, the threshold voltages ($V_0$) are simultaneously relatively high, usually even greater than 2 V.

The majority of the liquid-crystal media of the prior art have relatively unfavourable values for $\Delta n$, frequently greater than 0.10. However, such large $\Delta n$ values are not particularly advantageous for VAN displays, since VAN displays typically employ small optical retardation values. For example, use is made of a d·$\Delta n$ of approximately 0.30 $\mu$m in the case of an untwisted director orientation, or of a d·$\Delta n$ of approximately 0.40 $\mu$m in the case of a twist of 90°. Such large $\Delta n$ values require very small layer thicknesses to be achieved, which are favourable for the response times observed, but result in low production yields.

$\Delta n$ values in the range from 0.07 to 0.12 are often most favourable.

Furthermore, the response time of the displays of the prior art is frequently insufficiently long, in particular for video-capable displays. The viscosities of the liquid-crystal media are therefore to be improved, i.e. reduced. This applies in particular to the rotational viscosity and especially at low temperatures. A reduction in flow viscosity usually results in shorter filling times during production of the displays, in particular in the case of displays having a homeotropic edge alignment of the liquid crystals (e.g. in ECB and VAN displays).

There thus was and is a great demand for liquid-crystal media which do not have the disadvantages of the media of the prior art, or at least do so to a significantly reduced extent.

The liquid-crystal media according to the invention comprise a) one or more dielectrically negative compound(s) of the formula I

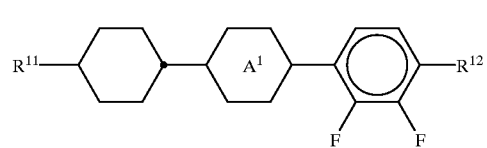

in which

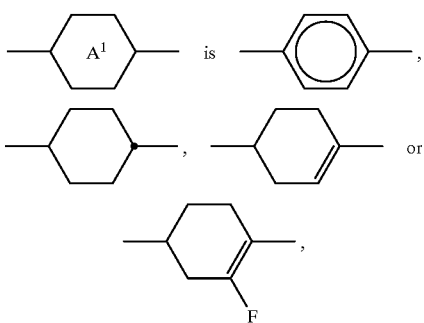

preferably

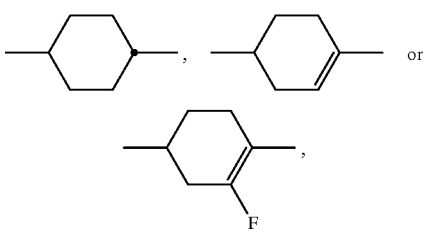

$R^{11}$ is alkoxy having 1 to 7 carbon atoms, preferably n-alkoxy and particularly preferably n-alkoxy having 2 to 5 carbon atoms, or alkenyloxy having 2 to 7 carbon atoms, preferably having 2 to 4 carbon atoms, and, in the case where

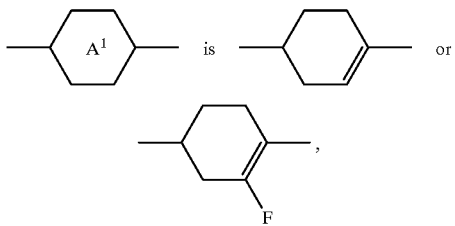

can also be alkyl having 1 to 7 carbon atoms, preferably n-alkyl, particularly preferably n-alkyl having 1 to 5 carbon atoms, and $R^{12}$ is alkyl having 1 to 7 carbon atoms, preferably n-alkyl, particularly preferably n-alkyl having 1 to 3 carbon atoms, alkoxy having 1 to 7 carbon atoms, preferably n-alkoxy, particularly preferably n-alkoxy having 2 to 5 carbon atoms, or alkenyloxy having 2 to 7 carbon atoms, preferably having 2 to 4 carbon atoms, b) one or more dielectrically negative compound(s) of the formula II

II

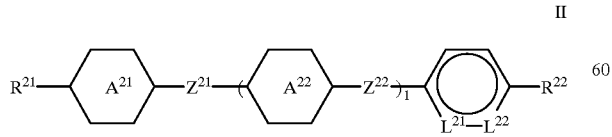

in which $R^{21}$ is alkyl having 1 to 7 carbon atoms, preferably n-alkyl and particularly preferably n-alkyl having 1 to 5 carbon atoms, alkoxy having 1 to 7 carbon atoms, preferably n-alkoxy and particularly preferably n-alkoxy having 2 to 5 carbon atoms, or alkenyloxy having 2 to 7 carbon atoms, preferably having 2 to 4 carbon atoms, $R^{22}$ is alkyl having 1 to 7 carbon atoms, preferably n-alkyl, particularly preferably n-alkyl having 1 to 3 carbon atoms, alkoxy having 1 to 7 carbon atoms, preferably n-alkoxy, particularly preferably n-alkoxy having 2 to 5 carbon atoms, or alkenyloxy having 2 to 7 carbon atoms, preferably having 2 to 4 carbon atoms, $Z^{21}$ and $Z^{22}$ are each, independently of one another, —CH$_2$—CH$_2$—, —CH=CH—, —C≡C—, —COO— or a single bond, preferably —CH$_2$—CH$_2$— or a single bond and particularly preferably a single bond,

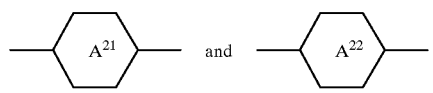

are each, independently of one another,

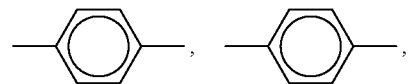

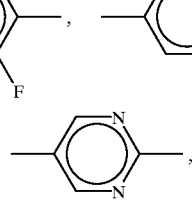

preferably

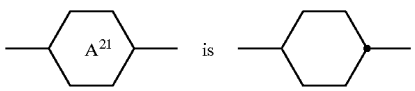

and, if present,

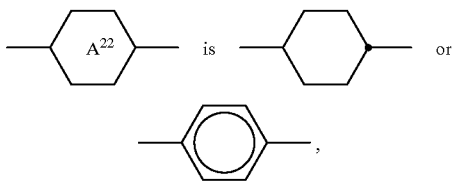

$L^{21}$ and $L^{22}$ are both C-F or one of the two is N and the other is C—F, preferably both C—F, and I is 0 or 1 the compounds of the formulae I and III being excluded, and optionally c) one or more dielectrically negative compound(s) of the formula III

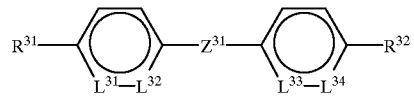

in which $R^3$ and $R^{32}$ are each alkyl having 1 to 7 carbon atoms, preferably n-alkyl and particularly preferably n-alkyl having 1 to 5 carbon atoms, alkoxy having 1 to 7 carbon atoms, preferably n-alkoxy and particularly preferably n-alkoxy having 2 to 5 carbon atoms, or alkenyloxy having 2 to 7 carbon atoms, preferably having 2 to 4 carbon atoms, very particularly preferably both n-alkoxy having 1 to 5 carbon atoms, $Z^{31}$ is as defined above for $Z^{21}$ in formula II, $L^{31}$ and $L^{32}$ are both C—F or one of the two is N and the other is C—F, and $L^{33}$ and $L^{34}$ are both C—F or one of the two is N and the other is C—F, and optionally d) one or more dielectrically neutral compound(s) of the formula IV

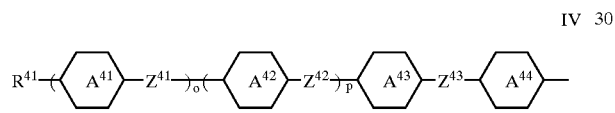

in which $R^{41}$ and $R^{42}$ are each, independently of one another, as defined above for $R^{21}$ under the formula II, and alternatively may also be alkenyl having 2–7 C atoms, preferably 2–5 C atoms, and $Z^{41}$, $Z^{42}$ and $Z^{43}$ are each, independently of one another, —CH$_2$CH$_2$—, —CH=CH—, —COO— or a single bond,

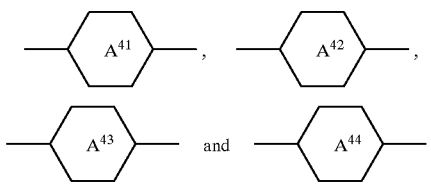

are each, independently of one another,

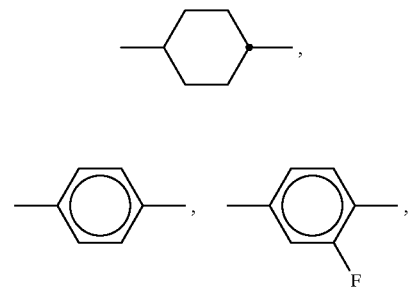

o and p, independently of one another, are 0 or 1, but preferably $R^{41}$ and $R^{42}$ are each, independently of one another, alkyl or alkoxy having 1–5 carbon atoms or alkenyl having 2–5 carbon atoms,

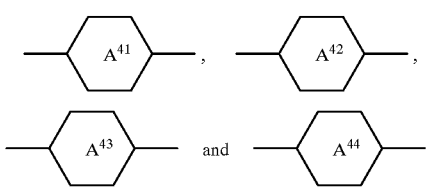

are each, independently of one another,

or

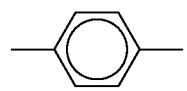

and very particularly preferably at least two of these rings are

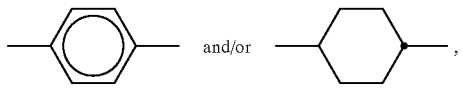

where two adjacent rings are very particularly preferably directly linked and are preferably

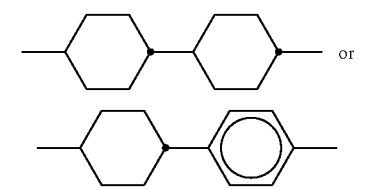

and optionally e) one or more dielectrically positive compound(s) of the formula V

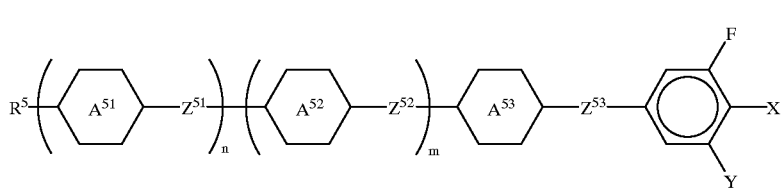

in which

R⁵ is alkyl or alkoxy having 1 to 7 carbon atoms, alkoxyalkyl, alkenyl or alkenyloxy having 2 to 7 carbon atoms, $Z^{51}$, $Z^{52}$ and $Z^{53}$ are each, independently of one another, —CH$_2$—CH$_2$—CH=CH—, —C≡C—, —COO— or a single bond,

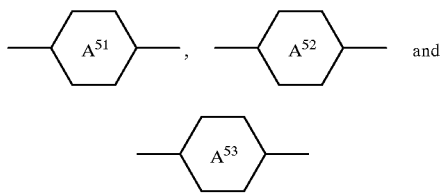

are each, independently of one another,

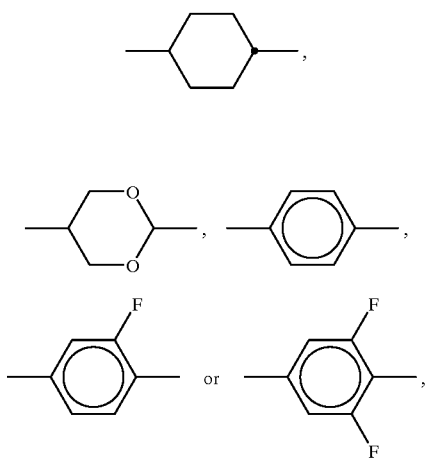

X is F, OCF$_2$H or OCF$_3$, and

Y is H or F, preferably, in the case where X=F or OCF$_2$H,

F and, in the case where X=OCF$_3$,

H or F, and n and m are each, independently of one another, 0 or 1.

The liquid-crystal media preferably comprise one or more compounds selected from the group consisting of compounds of the formulae I1 to I4, particularly preferably of the formulae I1 and I4:

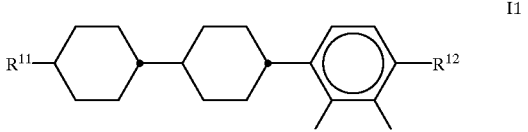

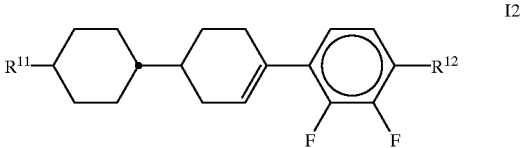

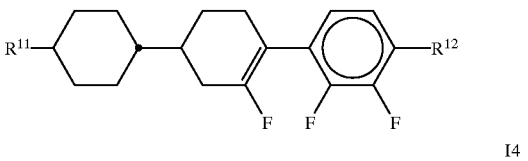

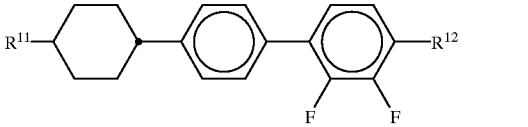

in which $R^{11}$ and $R^{12}$ are as defined above under the formula I, and preferably $R^{12}$ is n-alkyl having 1 to 7 carbon atoms, n-alkoxy having 1 to 7 carbon atoms or alkenyloxy having 2 to 7 carbon atoms, $R^{11}$ is n-alkoxy having 1 to 7 carbon atoms or alkenyloxy having 2 to 7 carbon atoms, and in the formulae I2 and I3 is also n-alkyl having 1 to 7 carbon atoms.

The liquid-crystal medium preferably comprises one or more compounds of the formula II1

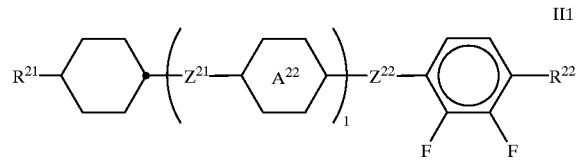

in which $R^{21}$, $R^{22}$, $Z^{12}$, $Z^{22}$,

and I are each as defined above under the formula II, and the compounds of the formula I are excluded. $R^{21}$ is preferably alkyl having 1–5 carbon atoms, $R^{22}$ is preferably alkyl or alkoxy, each having 1 to 5 carbon atoms, and $Z^{22}$ and $Z^{21}$, if present, are preferably a single bond.

The liquid-crystal media particularly preferably comprise one or more compounds selected from the group consisting of compounds of the formulae II1a to II1e:

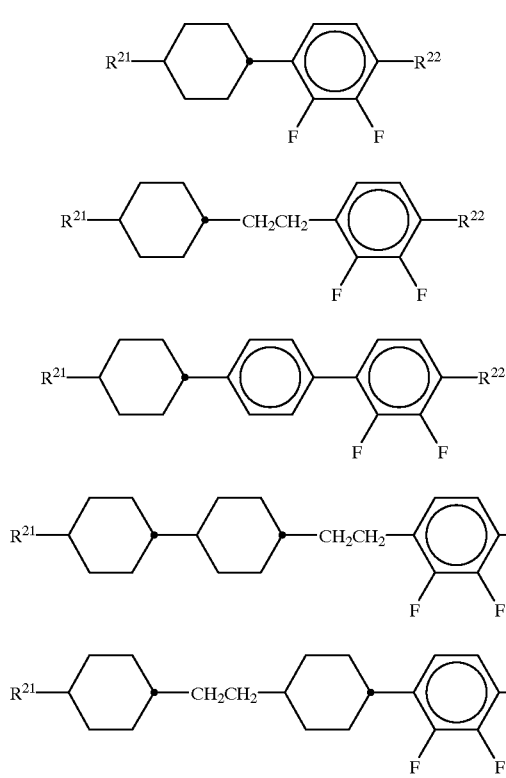

in which $R^{21}$ and $R^{22}$ are as defined above under the formula 11 and are preferably as defined under formula II1.

The liquid-crystal medium particularly preferably comprises one or more compounds selected from the group consisting of compounds of the formulae III1 to III3 and especially preferably of the formula III1:

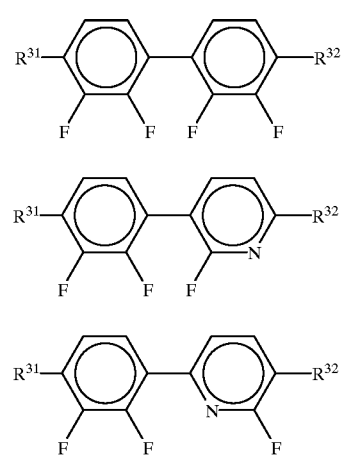

in which
$R^{31}$ and $R^{32}$ are as defined above under formula III and are preferably n-alkoxy.

The liquid-crystal medium particularly preferably comprises one or more compounds selected from the group consisting of compounds of the formulae IV1 to IV3:

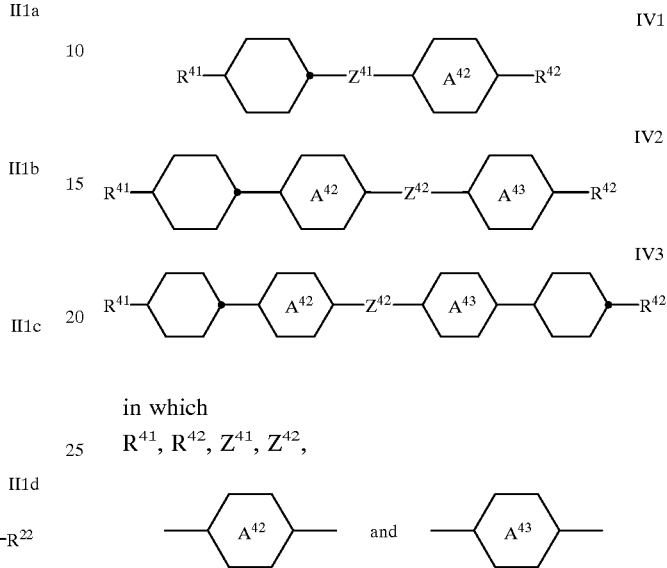

in which
$R^{41}$, $R^{42}$, $Z^{41}$, $Z^{42}$, $$-\!\!\!\left\langle A^{42} \right\rangle\!\!\!- \quad \text{and} \quad -\!\!\!\left\langle A^{43} \right\rangle\!\!\!-$$

are each as defined above under formula IV.

The liquid-crystal medium particularly preferably comprises one or more compounds selected from the group consisting of the compounds of the formulae IV1a to IV1d, IV2a to IV2e, IV3a to IV3c and IV4a:

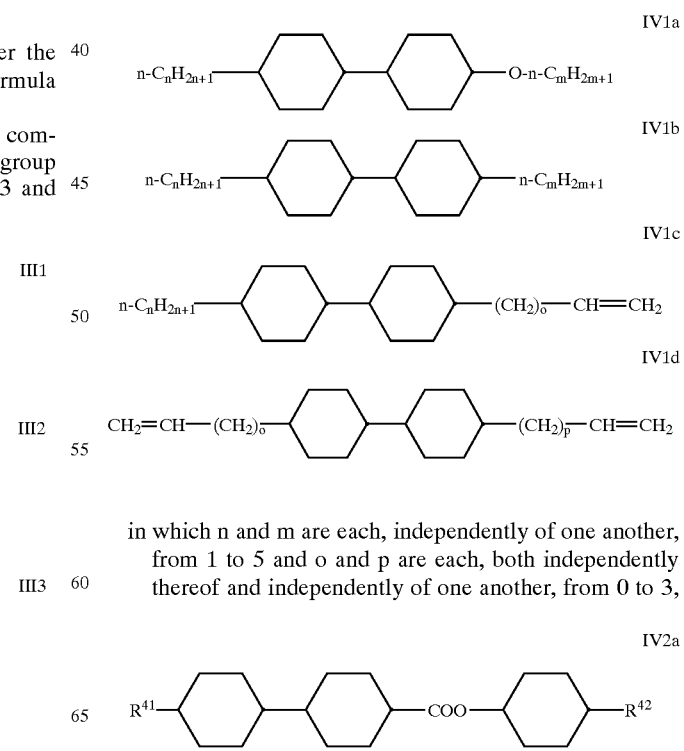

in which n and m are each, independently of one another, from 1 to 5 and o and p are each, both independently thereof and independently of one another, from 0 to 3, -continued

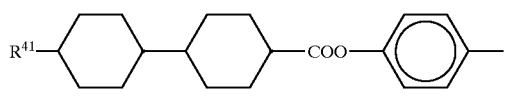
IV2b

IV2c

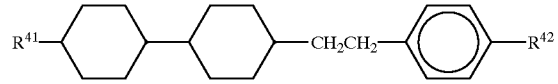
IV2d

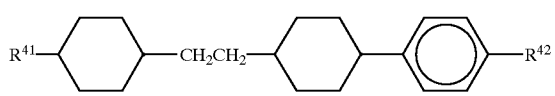
IV2e

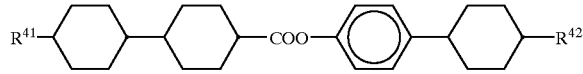
IV3a

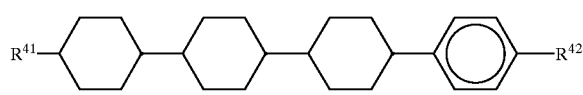
IV3b

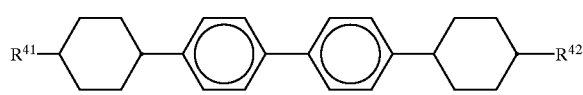
IV3c

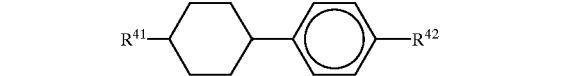
IV4a in which $R^{41}$ and $R^{42}$ are each as defined above under the formula IV1, and the phenyl rings may optionally be fluorinated, but not in such a way that the compounds are identical to those of the formula II and their subformulae. $R^{41}$ is preferably n-alkyl having 1 to 5 carbon atoms, particularly preferably having 1 to 3 carbon atoms, and $R^{42}$ is preferably n-alkyl or n-alkoxy having 1 to 5 carbon atoms or alkenyl having 2 to 5 carbon atoms. Of these, particular preference is given to compounds of the formulae IV1 a to IV1d.

The liquid-crystal media particularly preferably comprise one or more compounds selected from the group consisting of the compounds of the formulae V1 to V4:

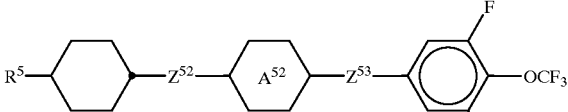
V1

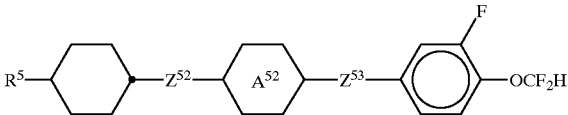
V2

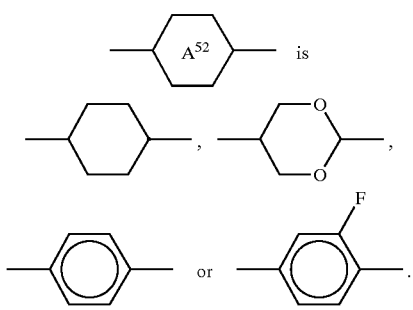
V3

V4 in which $R^5$, $Z^{52}$, $Z^{53}$ and

are as defined above under formula V, but preferably
$R^5$ is alkyl having 1–7 carbon atoms or alkenyl having 2–7 carbon atoms, preferably vinyl or 1E alkenyl, one of
$Z^{52}$ and $Z^{53}$ is a single bond and the other is —CH$_2$CH$_2$—, —COO— or a single bond, and

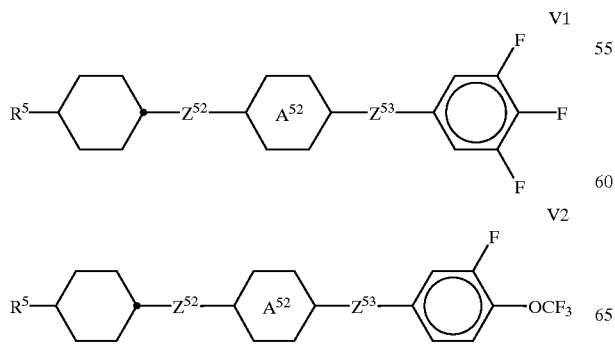

In a preferred embodiment, the liquid-crystal media according to the invention comprise in total, based on the total mixture,
from 5% to 80%, preferably from 10% to 50% and particularly preferably from 15% to 35%, of compounds of the formula I,
from 5% to 90%, preferably from 20% to 85%, particularly preferably from 30% to 80% and very particularly preferably from 35% to 75% of compounds of the formula II,
from 0% to 40%, preferably from 0% to 30% and particularly preferably from 5% to 20% of compounds of the formula III,
from 0% to 30%, preferably from 0% to 25% and preferentially from 5% to 15% of compounds of the formula IV, and
from 0% to 15%, preferably from 0% to 10% and preferentially from 1% to 5% of compounds of formula V.

Here and throughout the present description, the term compounds means both one and a plurality of compounds, if not explicitly stated otherwise.

The individual compounds are employed in concentrations in each case of from 1% to 30%, preferably from 2% to 30%, particularly preferably from 4% to 16%.

In a preferred embodiment, the liquid-crystal media particularly preferably comprise in total from 10% to 40% of compounds of the formula I,
from 50% to 90% of compounds of the formula II and
from 0% to 40% of compounds of the formula III.

In this embodiment, the liquid-crystal media very particularly preferably comprise in total from 15% to 35% of compounds of the formula I,
from 60% to 80% of compounds of the formula II and
from 0% to 15% of compounds of the formula III.

In a particularly preferred embodiment, which may be identical, and preferably is identical, to the preferred embodiments described above for the preferred concentration ranges, the liquid-crystal media comprise:

one or more compounds of the formula II and/or, preferably and, one or more compounds of the formula III and/or, one or more compounds of the formula I2 and/or, preferably and, one or more compounds of the formula I3 and/or, preferably and, one or more compounds of the formula II1 and/or one or more compounds selected from the group consisting of the compounds of the formulae III1 to III3 and/or one or more compounds selected from the group consisting of the compounds of the formulae IV1 to IV3, preferably of the formula IV1, and/or one or more compounds selected from the group consisting of the compounds of the formulae I1 to I3, preferably of the formula I3 and/or one or more compounds of the formula III, and one or more compounds of the formula Ill, preferably of the formula III1, and/or one or more compounds of the formula IV, preferably of the formula IV1, particularly preferably selected from the group consisting of the compounds of the formulae IV1a to IV1d, very particularly preferably selected from the group consisting of the compounds of the formulae V1c and IV1d and especially of the formula IV1d.

Particularly preferred liquid-crystal media are those which comprise one or more compounds of the formula II, in particular, in each case per compound, in concentrations of from 6% to 14%, and/or one or more compounds of the formula IIIa, in particular, in each case per compound, in concentrations of from 4% to 18%, and/or one or more compounds of the formula IIIc, in particular, in each case per compound, in concentrations of from 3% to 15%, preferably in each case one or more compounds in which $R^{21}$ is alkyl having 1 to 3 carbon atoms and $R^{22}$ is alkoxy having 1 to 3 carbon atoms and one or more compounds in which $R^{21}$ is alkyl having 1 to 3 carbon atoms and $R^{22}$ is alkyl having 1 to 3 carbon atoms and/or one or more compounds of the formulae IV1, preferably of the formulae IV1c and/or IV1d and/or one or more compounds selected from the group consisting of the compounds of the formulae V1 to V4.

The liquid-crystal media according to the invention preferably have nematic phases of in each case at least from −30° C. to 70° C., particularly preferably from −30° C. to 80° C., very particularly preferably from −40° C. to 80° C., most preferably from −40° C. to 110° C. The term having a nematic phase here means firstly that no smectic phase and no crystallization are observed at low temperatures at the corresponding temperature, and secondly that no clearing occurs during heating from the nematic phase. Testing at low temperatures is carried out in a flow viscometer at the corresponding temperature, and checked by storage in test cells having an appropriate layer thickness for electro-optical use, for at least 100 hours. At high temperatures, the clearing point is measured by conventional methods in capillaries.

The liquid-crystal media according to the invention are furthermore characterized by relatively low optical anisotropy values. The birefringence values are preferably in the range from 0.070 to 0.120, particularly preferably in the range from 0.080 to 0.110 and very particularly preferably in the range from 0.090 to 0.105.

In addition, the liquid-crystal media according to the invention have small threshold voltage values of less than or equal to 2.0 V, preferably less than or equal to 1.9 V, particularly preferably less than or equal to 1.85 V, very particularly preferably less than or equal to 1.8 V.

These preferred values for the individual physical properties are also maintained when in each case combined with one another. Thus, media according to the invention have, in particular, the following property combinations:

| Embodiment | Phase (T/° C.) | Δn | Freedericksz threshold voltage/V |
|---|---|---|---|
| Preferred | From ≦ −20 to ≧ 80 | ≧0.090 | ≦1.8 |
| Particularly Preferred | From ≦ −30 to ≧ 100 | ≧0.095 | ≦1.9 |
| Especially preferred | From ≦ −40 to ≧ 110 | ≧0.100 | ≦2.0 | where, as throughout the application, "≦" means less than or equal to and "≧" means greater than or equal to. The values in the second column represent the maximum lower limit and the minimum upper limit for the nematic temperature range.

Independently of the above-mentioned amounts of the limits for the compounds of the formulae I and III, compounds of the formula I are employed in the liquid-crystal media according to the present application in a concentration of up to about 25% per individual substance and compounds of the formula III are employed in a concentration of up to about 15%, preferably up to 10%, per individual substance. Compounds of the formula II are preferably employed in a concentration of up to about 20%, preferably up to 15%, per individual substance. These limits are 23% and 20%, respectively, for compounds of the formula I2, and 21% and 18%, respectively, for compounds of the formula I3.

In a preferred embodiment, the liquid-crystal media of the present application comprise:

one or more compounds of the formula I2 and/or, preferably or, one or more compounds of the formula I3, and one or more compounds of the formulae II1a and/or II1c,
preferably
one or more compounds of the formula II1a and
one or more compounds of the formula II1c.

The above-mentioned preferred concentration ranges particularly preferably also apply to this preferred combination of compounds.

In the present application, the term dielectrically positive compounds is taken to mean compounds having a Δε of >1.5, the term "dielectrically neutral compounds" is taken to mean compounds in which $-1.5 \leq \Delta\epsilon \leq 1.5$, and "dielectrically negative compounds" is taken to mean compounds in which $\Delta\epsilon$ is $<-1.5$. The dielectric anisotropy of the compounds is determined here by dissolving 10% of the compounds in a liquid-crystalline host and determining the capacitance of this mixture at 1 kHz in at least one test cell each with a thickness of 10 μm and a homeotropic and homogeneous surface alignment. The measurement voltage is typically from 0.5 V to 1.0 V, but is always less than the capacitive threshold of the respective liquid-crystal mixture.

The host mixture used for dielectrically positive compounds is ZLI-4792 and that used for dielectrically neutral and dielectrically negative compounds is ZLI-3086, both from Merck KGaA, Germany. The values for the respective compounds to be investigated are obtained from the change in dielectric constants of the host mixture after addition of the compound to be investigated and extrapolation to 100% of the compound employed.

The term threshold voltage usually relates to the optical threshold for 10% relative contrast ($V_{10}$), unless explicitly stated otherwise.

However, in relation to the liquid-crystal mixtures of negative dielectric anisotropy, the term threshold voltage is used in the present application for the capacitive threshold voltage ($V_0$), also known as the Freedericksz threshold, unless explicitly stated otherwise.

All concentrations in this application, unless explicitly stated otherwise, are given in per cent by weight and relate to the corresponding mixture as a whole. All physical properties are and have been determined as described in Merck Liquid Crystals, Physical Properties of Liquid Crystals, Status November 1997, Merck KGaA, Germany, and apply to a temperature of 20° C., unless explicitly stated otherwise. $\Delta n$ is determined at 589 nm and $\Delta\epsilon$ at 1 kHz.

For the liquid-crystal media having negative dielectric anisotropy the threshold voltage was determined as the capacitive threshold voltage $V_0$ (also known as the Freedericksz threshold) in test cells produced at Merck KGaA, Germany, and containing liquid crystals which had been homeotropically aligned by lecithin.

The threshold voltages $V_{10}$ and the other electro-optical properties were determined in test cells produced at Merck KGaA, Germany, using white light in a commercial measuring instrument from Otsuka, Japan. To this end, cells were used, depending on $\Delta n$ of the liquid crystals, with a thickness corresponding to an optical retardation d·$\Delta n$ of the cells of about 0.40 μm. The cells were operated using crossed polarizers. The characteristic voltages were all determined with perpendicular observation. The threshold voltage was given as $V_{10}$ for 10% relative contrast, the central limit voltage $V_{50}$ for 50% relative contrast and the saturation voltage $V_{90}$ for 90% relative contrast.

The liquid-crystal media according to the invention may, if necessary, also comprise further additives and chiral dopants in conventional amounts. The amount of these additives employed is in total from 0% to 10%, based on the total amount of mixture, preferably from 0.1% to 6%. The concentrations of the individual compounds employed are preferably from 0.1 to 3%. The concentration of these and similar additives is not taken into account when giving the concentrations and the concentration ranges of the liquid-crystal compounds in the liquid-crystal media.

The compositions consist of a plurality of compounds, preferably from 3 to 30, particularly preferably from 6 to 20, very particularly preferably from 10 to 16 compounds, which are mixed in a conventional manner. In general, the desired amount of the components used in lesser amount is dissolved in the components making up the principal constituent, expediently at elevated temperature. If the temperature selected is above the clearing point of the principal constituent, completion of the dissolution operation is particularly easily observed. However, it is also possible to prepare the liquid-crystal mixtures in other conventional ways, for example by using premixtures or from a so-called multibottle system.

By means of suitable additives, the liquid-crystal phases according to the invention can be modified in such a way that they can be employed in any type of ECB, VAN, IPS, GH or ASM-PA LCD display that has been disclosed hitherto.

The examples below illustrate the invention without limiting it. In the examples, the melting point T (C,N), the transition from the smectic (S) to the nematic (N) phase T (S,N) and the clearing point T (N,I) of a liquid-crystal substance are given in degrees Celsius. The percentage data denote percent by weight.

Unless stated otherwise, all percentages above and below are per cent by weight, and the physical properties are the values at 20° C., unless explicitly stated otherwise.

All temperature values given in this application are ° C. and all temperature differences are correspondingly difference degrees, unless explicitly stated otherwise.

The entire disclosure of all applications, patents and publications, cited above and below, and of corresponding German Application No. 100 14 882.4, filed Mar. 24, 2000, is hereby incorporated by reference.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | ON | F | H |
| nN.F.F | $C_nH_{2n+1}$ | ON | F | F |
| nF | $C_nH_{2n+1}$ | F | H | H |
| nF.F | $C_nH_{2n+1}$ | F | F | H |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nmF | $C_nH_{2n+1}$ | $C_mH_{2m+1}$ | F | H |
| $nOF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NOS | H | H |
| rVsN | $C_rH_{2r+1}$—CH=CHC$_s$H$_{2s}$— | CN | H | H |
| rEsN | $C_rH_{2r+1}$—O—C$_s$H$_{2s}$— | CN | H | H |
| nAm | $C_nH_{2n+1}$ | $COOC_mH_{2m+1}$ | H | H |
| nF.Cl | $C_nH_{2n+1}$ | F | Cl | H |

TABLE A
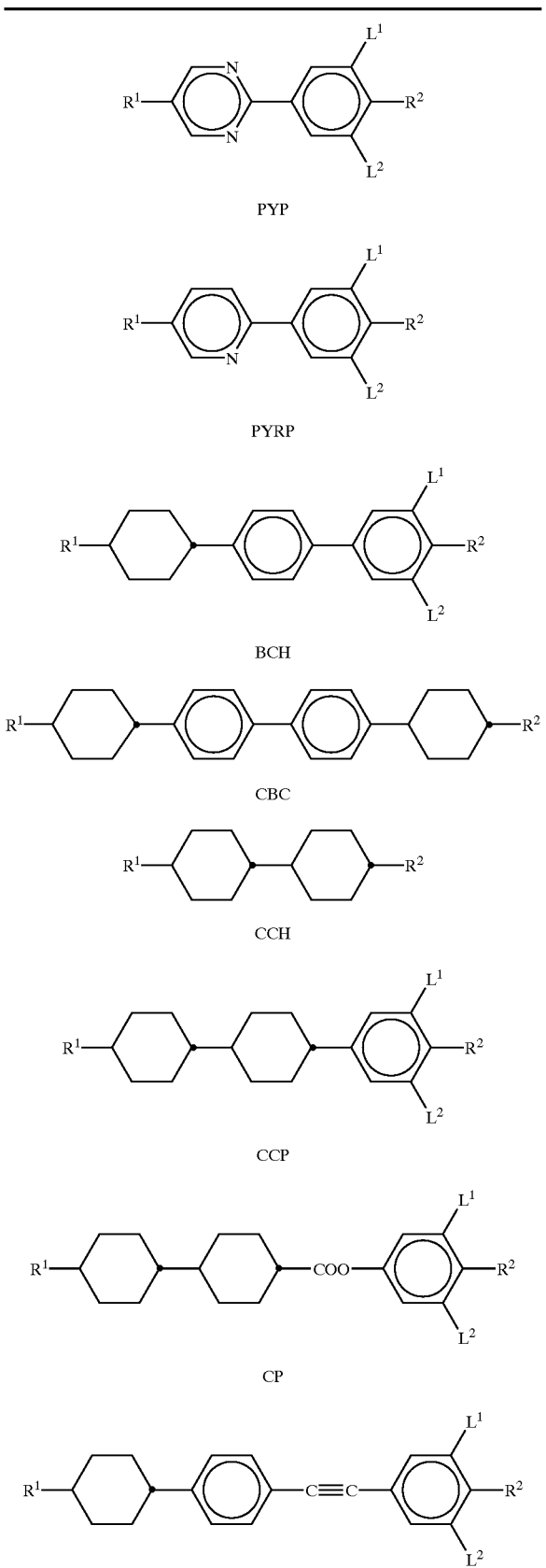
PYP
PYRP
BCH
CBC
CCH
CCP
CP
TABLE A-continued
CPTP
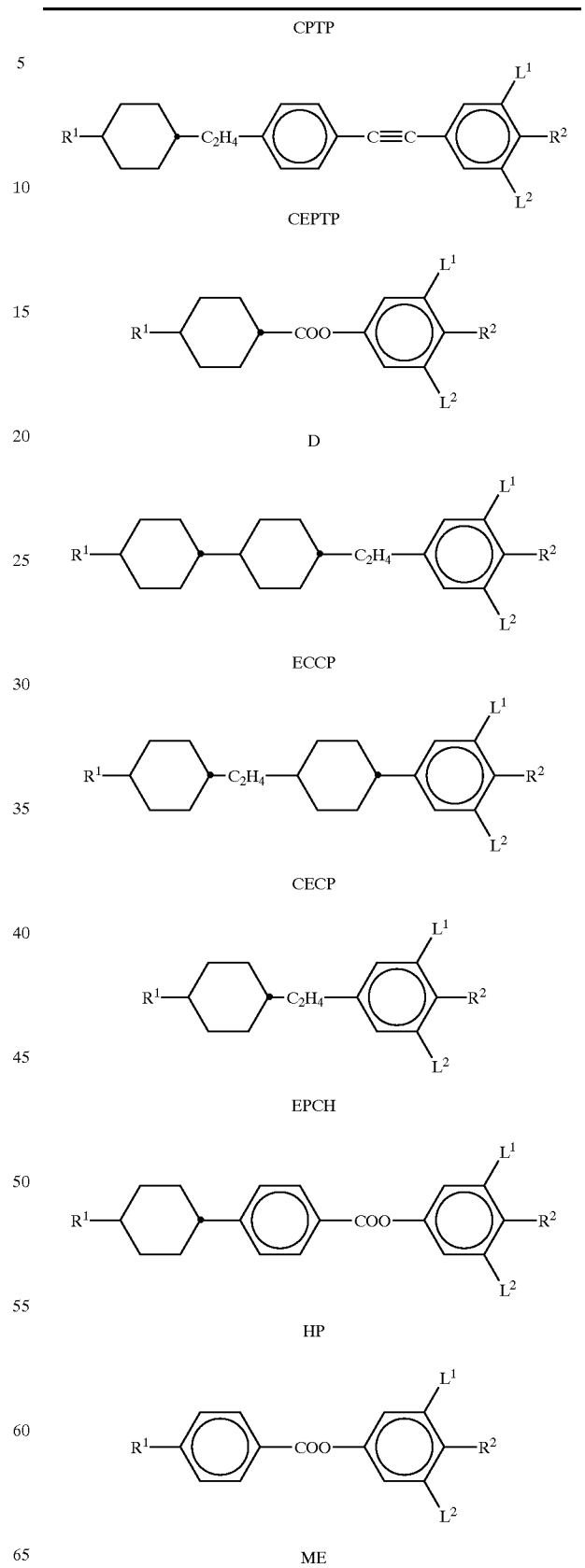
CEPTP
D
ECCP
CECP
EPCH
HP
ME TABLE A-continued
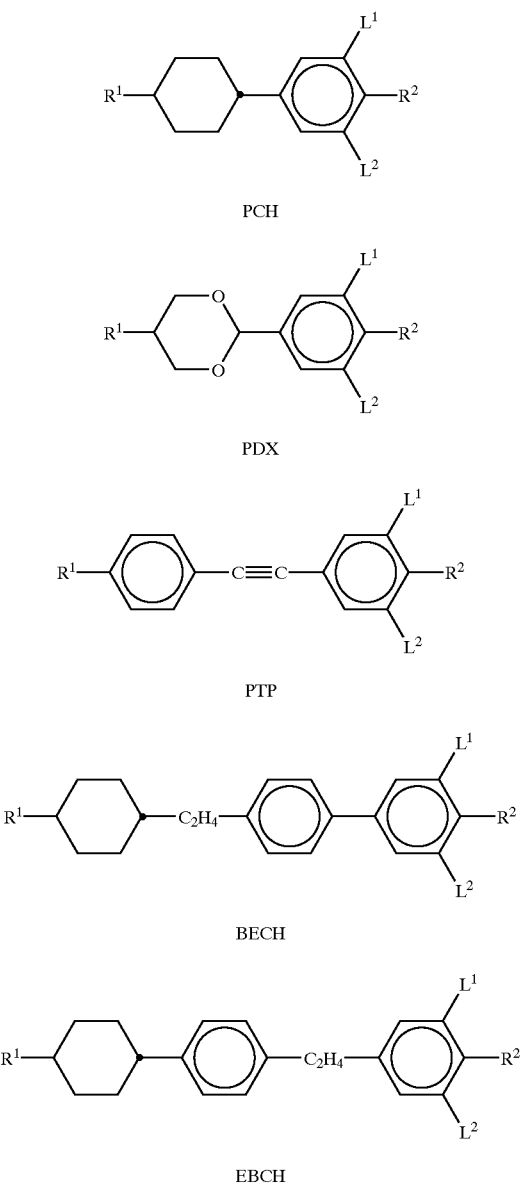
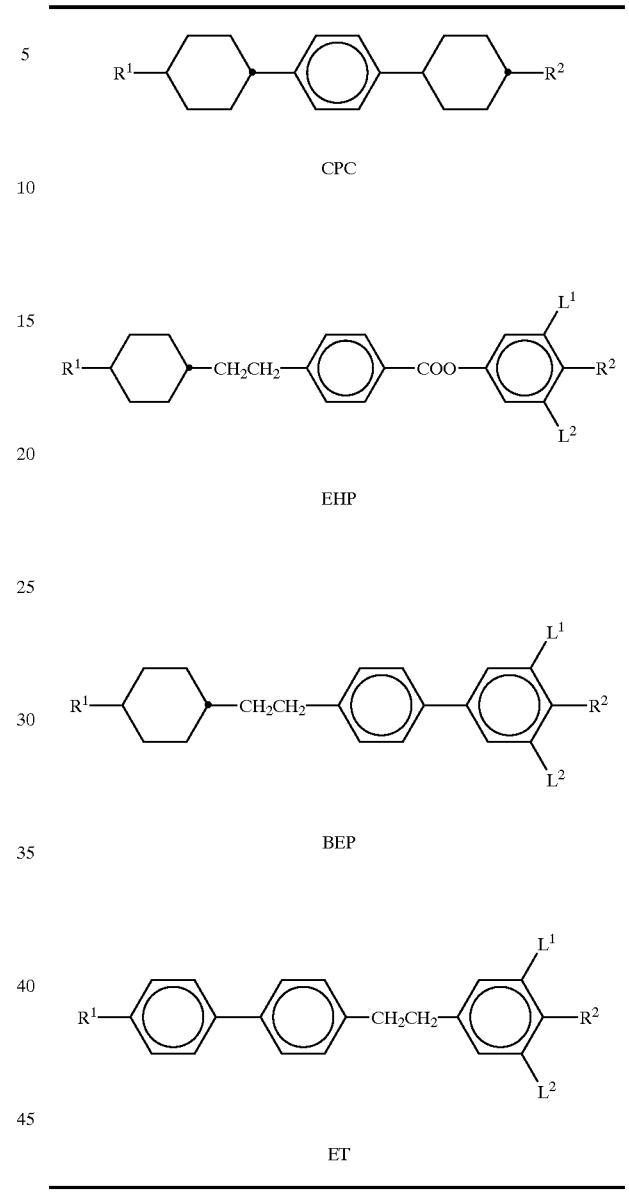
TABLE B
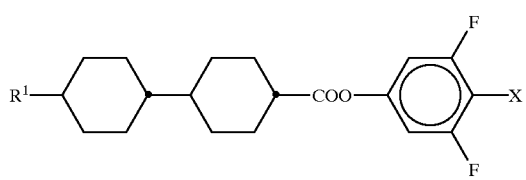
CCZU-n-X
X = F, Cl or OCF3

TABLE B-continued
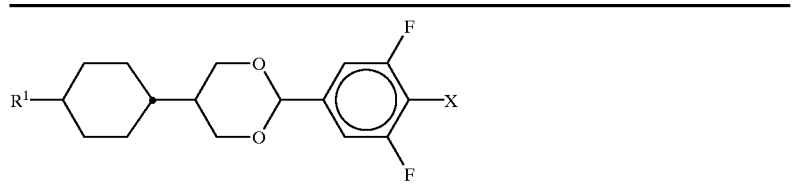
CDU-n-X
X = F, Cl or OCF3
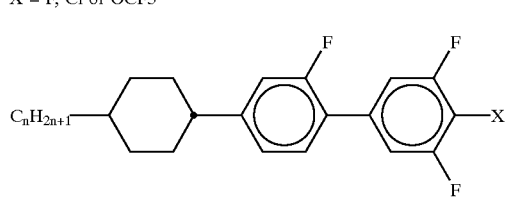
CGU-n-X
X = F, Cl or OCF3
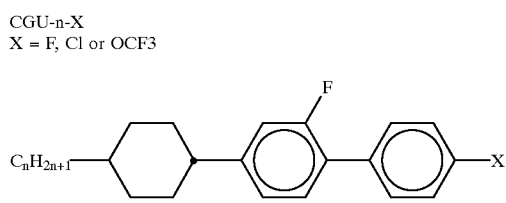
BCH-n.FX
X = F, Cl or OCF3
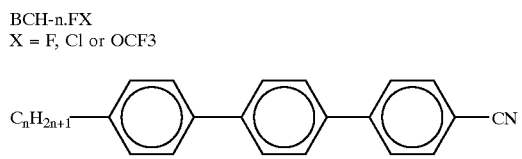
T3-n
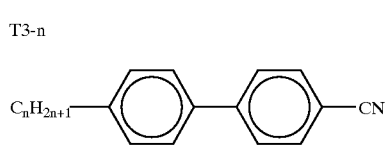
K3-n
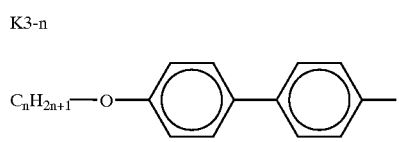
M3-n
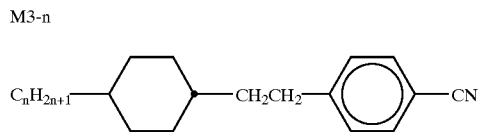
G3-n
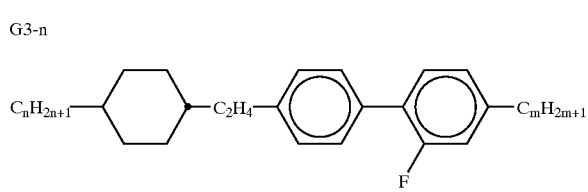
Inm
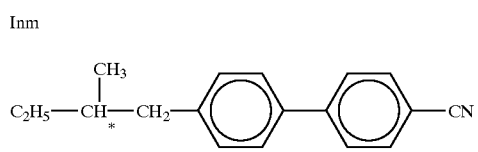
CB15

TABLE B-continued

C15: $C_2H_5$-CH($CH_3$)*-$CH_2$-O-[phenyl]-[phenyl]-CN

BCH-nmF: $C_nH_{2n+1}$-[cyclohexyl]-[phenyl(F)]-[phenyl]-$C_mH_{2m+1}$

CBC-nmF: $C_nH_{2n+1}$-[cyclohexyl]-[phenyl(F)]-[phenyl]-[cyclohexyl]-$C_mH_{2m+1}$

CCN-nm: $C_nH_{2n+1}$-[cyclohexyl]-[cyclohexyl(CN)]-$C_mH_{2m+1}$

C-nm: $C_nH_{2n+1}$-[cyclohexyl]-[cyclohexyl]-OCC-$C_mH_{2m+1}$

CCEPC-nm: $C_nH_{2n+1}$-[cyclohexyl]-[cyclohexyl]-$CH_2CH_2$-[phenyl]-[cyclohexyl]-$C_mH_{2m+1}$

CCPC-nm: $C_nH_{2n+1}$-[cyclohexyl]-[cyclohexyl]-COO-[phenyl]-[cyclohexyl]-$C_mH_{2m+1}$

CH-nm: $C_nH_{2n+1}$-[cyclohexyl]-[cyclohexyl]-COO-[cyclohexyl]-$C_mH_{2m+1}$

HD-nm: $C_nH_{2n+1}$-[cyclohexyl]-[phenyl]-OOC-[cyclohexyl]-$C_mH_{2m+1}$

HH-nm: $C_nH_{2n+1}$-[cyclohexyl]-[phenyl]-COO-[cyclohexyl]-$C_mH_{2m+1}$ $C_2H_5$-[cyclohexyl]-COO-[phenyl]-[phenyl]-CN TABLE B-continued
CHE
NCB-nm
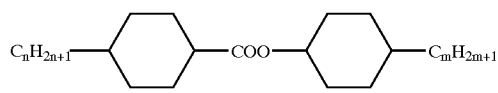
OS-nm
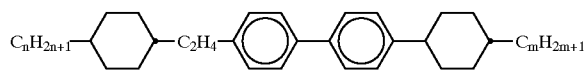
ECBC-nm
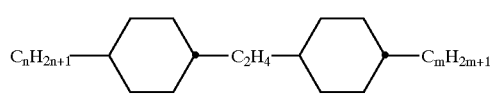
ECCH-nm
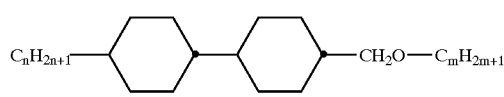
CCH-n1EM
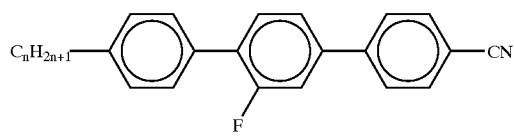
T-nFN
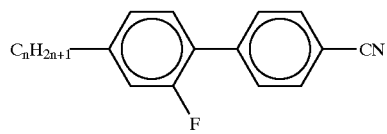
B-nO.FN
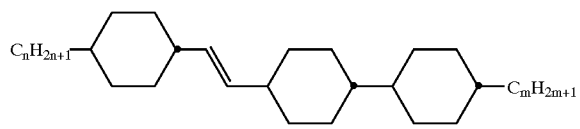
CVCC-n-m
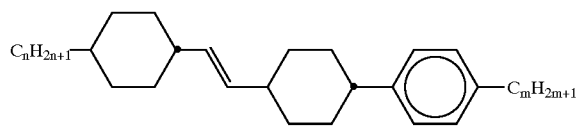
CVCP-n-m
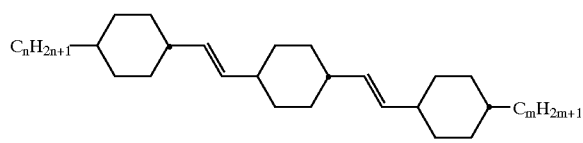

TABLE B-continued
CVCVC-n-m
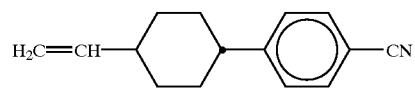
CP-V-N
CC-n-V
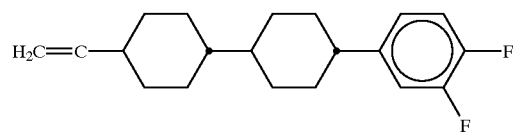
CCG-V-F
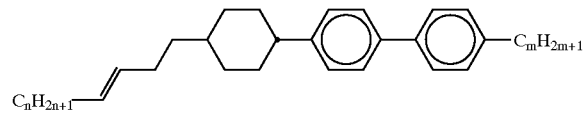
CPP-nV2-m
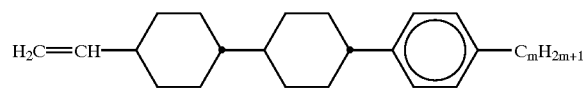
CCP-V-m
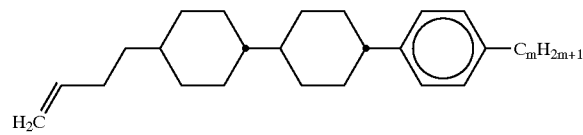
CCP-V2-m
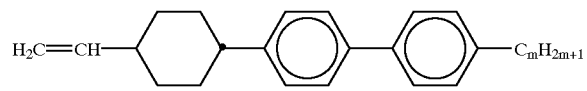
CPP-V-m
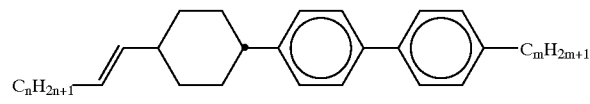
CPP-nV-m
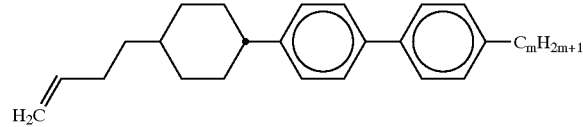
CPP-V2-m
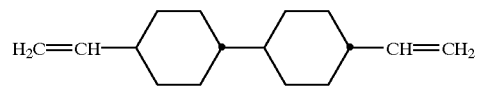

TABLE B-continued
CC-V-V
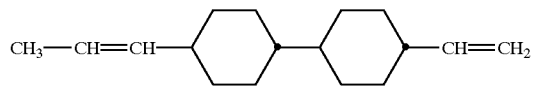
CC-1V-V
CC-1V-V1
CC-2V-V
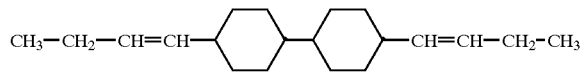
CC-2V-V2
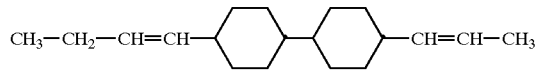
CC-2V-V1
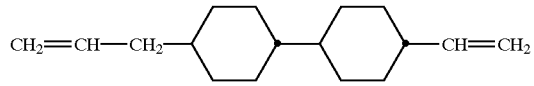
CC-V1-V
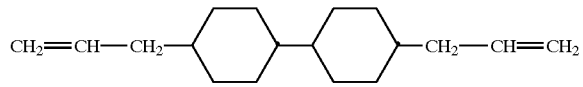
CC-V1-1V
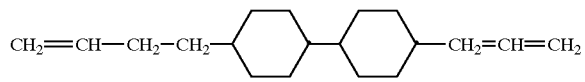
CC-V2-1V
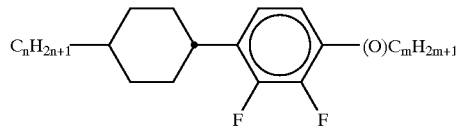
PCH-n(O)mFF
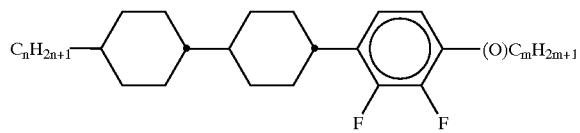
CCP-n(O)mFF TABLE B-continued
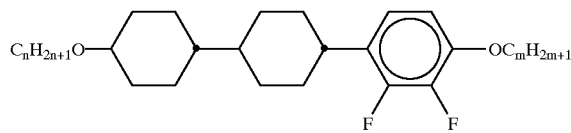
CCY-nO-Om
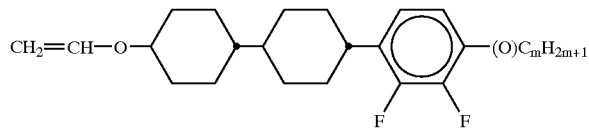
CCY-VO-(O)m
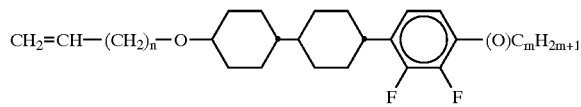
CCY-VnO-(O)m
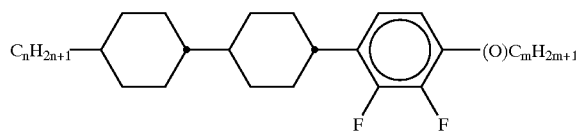
CLY-n-(O)m
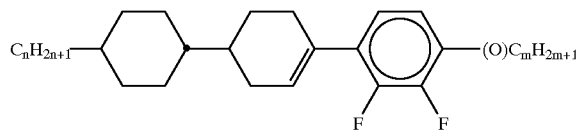
CLY-nO-(O)m
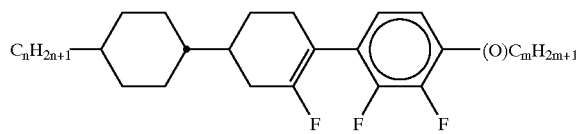
CFY-n-(O)m
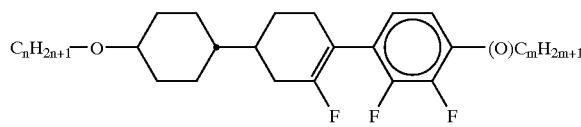
CFY-nO-(O)m
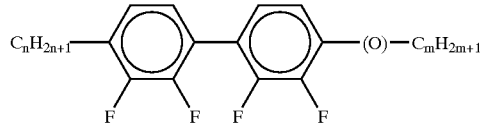
YY-n-(O)m

TABLE B-continued

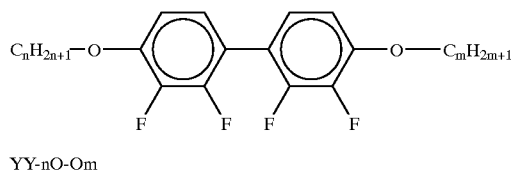

YY-nO-Om

EXAMPLES

The examples below are intended to illustrate the invention without representing a limitation. Above and below, percentages are per cent by weight. All temperatures are given in degrees Celsius. Δn is the optical anisotropy (589 nm, 20° C.), Δε the dielectric anisotropy (1 kHz, 20° C.), H.R. the voltage holding ratio (at 100° C., after 5 minutes in an oven, 1 V), and $V_{10}$, $V_{50}$ and $V_{90}$ the threshold voltage, mid-grey voltage and saturation voltage respectively were determined at 20° C.

Example 1

| Compound/<br>abbreviation | Concentration/<br>% by mass | Physical properties |
|---|---|---|
| CC-5-V | 5.0 | Clearing point (N,I) = 101.5° C. |
| PCH-304FF | 9.0 | $n_e$ (20° C., 589 nm) = 1.5788 |
| PCH-504FF | 9.0 | Δn (20° C., 589 nm) = 0.0998 |
| CCP-202FF | 9.0 | $\epsilon_\perp$(20° C., 1 kHz) = 12.0 |
| CCP-302FF | 10.0 | Δε(20° C., 1 kHz) = −7.7 |
| CCP-502FF | 9.0 | $k_1$ (20° C.) = 16.7 pN |
| CCP-21FF | 11.0 | $k_3/k_1$ = 1.11 |
| CCP-31FF | 10.0 | $V_0$ (20° C.) = 1.64 V |
| CCY-3O-O2 | 10.0 | |
| CCY-V1O-O2 | 10.0 | |
| YY-3O-O2 | 8.0 | |
| Σ | 100.0 | |

The liquid-crystal medium is introduced into a VA display with TFT addressing. This display has good contrast with low viewing-angle dependence.

Example 2

| Compound/<br>abbreviation | Concentration/<br>% by mass | Physical properties |
|---|---|---|
| PCH-304FF | 10.0 | Clearing point (N,I) = 104.0° C. |
| PCH-504FF | 10.0 | $n_e$ (20° C., 589 nm) = 1.5788 |
| CCP-202FF | 10.0 | Δn (20° C., 589 nm) = 0.0980 |
| CCP-302FF | 10.0 | $\epsilon_\perp$(20° C., 1 kHz) = 9.8 |
| CCP-502FF | 9.0 | Δε (20° C., 1 kHz) = −5.8 |
| CCP-21FF | 12.0 | $k_1$ (20° C.) = 17.0 pN |
| CCP-3IFF | 11.0 | $k_3/k_1$ = 1.20 |
| CCY-VO-1 | 10.0 | $V_0$ (20° C.) = 1.98 V |
| CCY-V1O-1 | 10.0 | |
| CCY-1V1O-1 | 8.0 | |
| Σ | 100.0 | |

As in Example 1, the liquid-crystal medium is introduced into a VA display with TFT addressing. This display has good contrast with low viewing-angle dependence.

Example 3

| Compound/<br>abbreviation | Concentration/<br>% by mass | Physical properties |
|---|---|---|
| PCH-304FF | 11.0 | Clearing point (N,I) = 118.5° C. |
| PCH-504FF | 11.0 | $n_e$ (20° C., 589 nm) = 1.5845 |
| CCP-202FF | 9.0 | Δn (20° C., 589 nm) = 0.1042 |
| CCP-302FF | 9.0 | $\epsilon_\perp$(20° C., 1 kHz) = 10.6 |
| CCP-502FF | 8.0 | Δε (20° C., 1 kHz) = −5.7 |
| CCP-21FF | 12.0 | $k_1$ (20° C.) = 20.7 pN |
| CCP-31FF | 12.0 | $k_3/k_1$ = 1.10 |
| CLY-5-O2 | 18.0 | $V_0$ (20° C.) = 1.94 V |
| CFY-3-O2 | 4.0 | |
| CFY-5-O2 | 6.0 | |
| Σ | 100.0 | |

As in Example 1, the liquid-crystal medium is introduced into a VA display with TFT addressing. This display has good contrast with low viewing-angle dependence.

Example 4

| Compound/<br>abbreviation | Concentration/<br>% by mass | Physical properties |
|---|---|---|
| PCH-304FF | 20.0 | Clearing point (N,I) = 87.0° C. |
| PCH-504FF | 20.0 | $n_e$ (20° C., 589 nm) = 1.5834 |
| CCP-302FF | 14.0 | Δn (20° C., 589 nm) = 0.1020 |
| CCP-3IFF | 6.0 | $\epsilon_\perp$(20° C., 1 kHz) = 8.7 |
| CC-3-V1 | 11.0 | Δε (20° C., 1 kHz) = −4.9 |
| CCP-V-1 | 3.0 | |
| BCH-32 | 10.0 | |
| CLY-3-O2 | 8.0 | |
| CLY-5-O2 | 8.0 | |
| Σ | 100.0 | |

As in Example 1, the liquid-crystal medium is introduced into a VA display with TFT addressing. This display has good contrast with low viewing-angle dependence.

Comparative Example 1

| Compound/<br>abbreviation | Concentration/<br>% by mass | Physical properties |
|---|---|---|
| PCH-302FF | 16.0 | Clearing point (N,I) = 71.0° C. |
| PCH-502FF | 14.0 | Transition (S, N) < −30° C. |
| CCP-302FF | 12.0 | $n_e$ (20° C., 589 nm) = 1.5587 |
| CCP-502FF | 11.0 | Δn (20° C., 589 nm) = 0.0822 |
| CCP-21FF | 9.0 | $\epsilon_\perp$(20° C., 1 kHz) = 7.4 |
| CCP-31FF | 8.0 | Δε (20° C., 1 kHz) = −3.8 |
| CCH-34 | 8.0 | ν (20° C.) = 21 cSt |

-continued

| Compound/ abbreviation | Concentration/ % by mass | Physical properties |
|---|---|---|
| CCH-35 | 8.0 | ν (0° C.) = 67 cSt |
| PCH-53 | 7.0 | ν (−20° C.) = 420 cSt |
| PCH-301 | 6.0 | ν (−30° C.) = 1380 cSt |
| Σ | 100.0 | |

The liquid-crystal medium is introduced into a VA display with TFT addressing. This display can be addressed, to some extent, only by means of a relatively high operating voltage and has insufficient contrast, in particular at higher temperatures from about 45° C.

Example 5

| Compound/ abbreviation | Concentration/ % by mass | Physical properties |
|---|---|---|
| CCY-V1O-O2 | 20.0 | Clearing point (N,I) = 93.3° C. |
| PCH-302 | 8.0 | Δn (20° C., 589 nm) = 0.0783 |
| CCH-301 | 26.4 | Δε (20° C., 1 kHz) = −3.1 |
| CCN-47 | 8.8 | |
| CCN-55 | 8.0 | |
| PCH-301 | 8.0 | |
| CBC-33 | 4.0 | |
| CBC-53 | 4.8 | |
| CBC-33F | 4.0 | |
| CBC-53F | 4.0 | |
| CBC-55F | 4.0 | |
| Σ | 100.0 | |

As in Example 1, the liquid-crystal medium is introduced into a VA display with TFT addressing. This display has good contrast with low viewing-angle dependence.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A nematic liquid-crystal medium comprising:

a) one or more dielectrically negative compound(s) of formula I

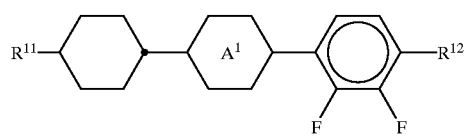

in which

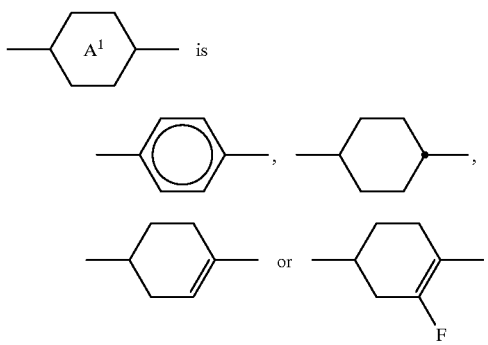

$R^{11}$ is alkoxy having 1 to 7 carbon atoms or alkenyloxy having 2 to 7 carbon atoms, and, in the case where

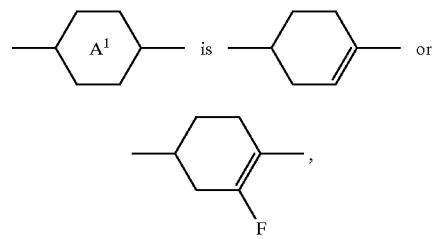

$R^{11}$ can also be alkyl having 1 to 7 carbon atoms; and $R^{12}$ is alkyl having 1 to 7 carbon atoms, alkoxy having 1 to 7 carbon atoms, alkenyloxy having 2 to 7 carbon atoms, b) one or more dielectrically negative compound(s) of formula II

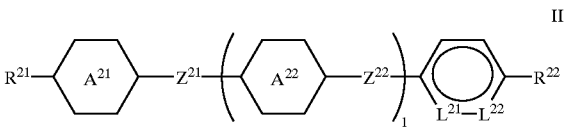

in which $R^{21}$ is alkyl having 1 to 7 carbon atoms, alkoxy having 1 to 7 carbon atoms, or alkenyloxy having 2 to 7 carbon atoms, $R^{22}$ is alkyl having 1 to 7 carbon atoms, alkoxy having 1 to 7 carbon atoms, or alkenyloxy having 2 to 7 carbon atoms, $Z^{21}$ and $Z^{22}$ are, in each case, independently, —CH$_2$—CH$_2$—, —CH=CH—, —C≡C—, —COO— or a single bond,

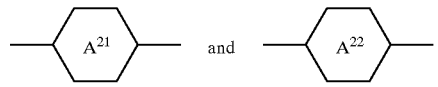

are, in each case independently,

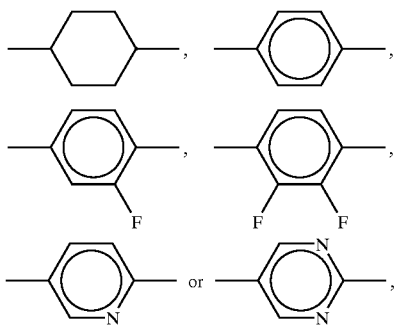

$L^{21}$ and $L^{22}$ are both C—F or one of the two is N and the other is C—F, l is 0 or 1, the compounds of the formulae I and III being excluded from the one or more dielectrically negative compound(s) of formula II, c) optionally one or more dielectrically negative compound(s) of the formula III

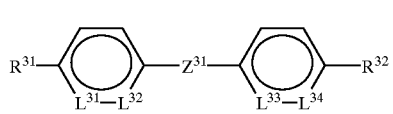

III in which $R^{31}$ and $R^{32}$ are each independently, alkyl having 1 to 7 carbon atoms, alkoxy having 1 to 7 carbon atoms or alkenyloxy having 2 to 7 carbon atoms, $Z^{31}$ is —CH$_2$—CH$_2$—, —CH=CH—, —C≡C—, —COO— or a single bond, $L^{31}$ and $L^{32}$ are both C—F or one of the two is N and the other is C—F, and $L^{33}$ and $L^{34}$ are both C—F or one of the two is N and the other is C—F.

2. A liquid-crystal medium according to claim 1, wherein said medium contains one or more compounds of formulae I1 to I3;

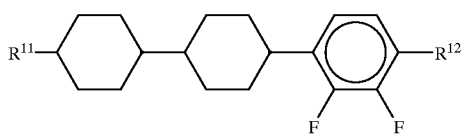

I1

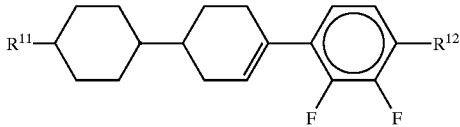

I2

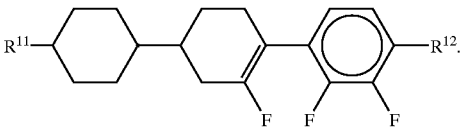

I3

3. A liquid-crystal medium according to claim 2, wherein said medium contains one or more compounds of formula III.

4. A liquid-crystal medium according to claim 2, further comprising one or more dielectrically neutral compounds of formula IV

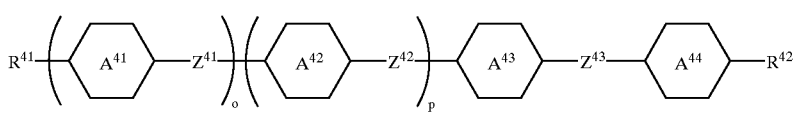

IV in which $R^{41}$ and $R^{42}$ are each, independently of one another, alkyl having 1 to 7 carbon atoms, alkoxy having 1 to 7 carbon atoms, alkenyl having 2 to 7 carbon atoms, or alkenyloxy having 2 to 7 carbon atoms, and $Z^{41}$, $Z^{42}$ and $Z^{43}$ are each, independently of one another, —CH$_2$CH$_2$—, —CH=CH—, —COO— or a single bond,

are each, independently of one another,

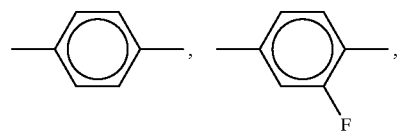

-continued

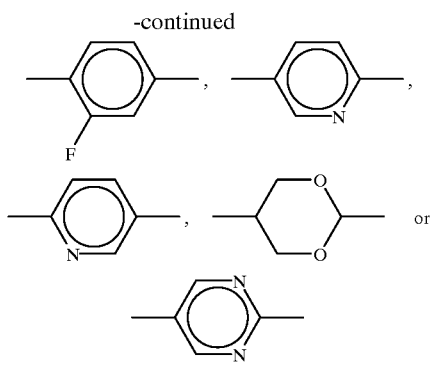

and o and p, independently of one another, are 0 or 1.

5. A liquid-crystal medium according to claim 2, wherein said medium comprises 5%–80% of compounds of formula I,
5%–90% of compounds of formula II, and
0%–40% of compounds of formula III.

6. In an electro-optical display containing a liquid-crystal medium, the improvement wherein said display contains a medium according to claim 2.

7. A liquid crystal medium according to claim 2, wherein said medium contains one or more dielectrically positive compound(s) of formula V

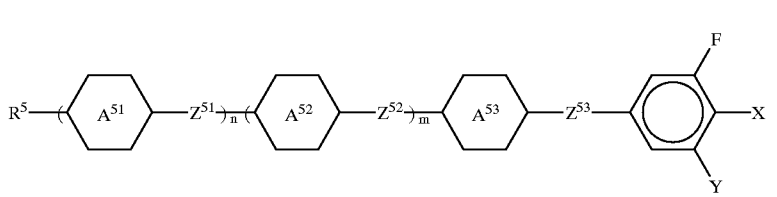

in which $R^5$ is alkyl having 1 to 7 carbon atoms, alkoxy having 1 to 7 carbon atoms, alkoxyalkyl having 2 to 7 carbon atoms, alkenyl having 2 to 7 carbon atoms or alkenyloxy having 2 to 7 carbon atoms, $Z^{51}$, $Z^{52}$ and $Z^{53}$ are each, independently of one another, —CH$_2$—CH$_2$—, —CH═CH—, —C≡C—, —COO— or a single bond,

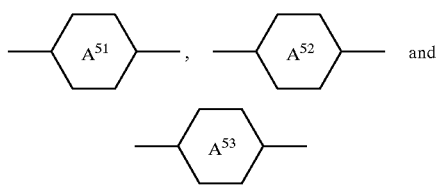

are each, independently of one another,

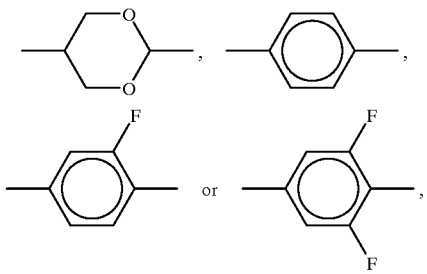

X is F, OCF$_2$H or OCF$_3$,
Y is H or F, and
n and m are each, independently of one another, 0 or 1.

8. A liquid-crystal medium according to claim 2, wherein said medium exhibits a nematic phase at −30° C. to 70° C.

9. A liquid-crystal medium according to claim 2, wherein said medium has a birefringence value of 0.070 to 0.120.

10. A liquid-crystal medium according to claim 2, where said medium has a threshold voltage value of ≦2.0V.

11. In an electro-optical display containing a liquid-crystal medium, the improvement wherein said display contains a medium according to claim 2.

12. A display according to claim 11, wherein said display is an active matrix display.

13. A medium according to claim 2, wherein the medium has a Δn≧0.090.

14. A liquid-crystal medium according to claim 1, wherein said medium contains one or more compounds of formula III.

15. A liquid-crystal medium according to claim 14, wherein said medium contains one or more compounds of formulae III1 to III3

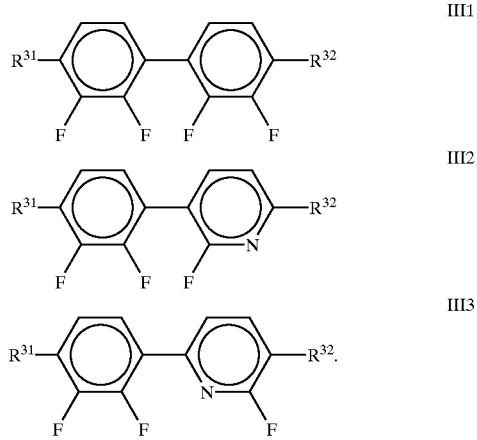

16. A liquid-crystal medium according to claim 1, further comprising one or more dielectrically neutral compounds of formula IV

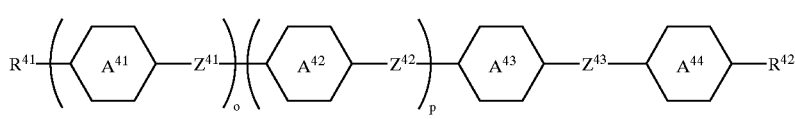

in which

R$^{41}$ and R$^{42}$ are each, independently of one another, alkyl having 1 to 7 carbon atoms, alkoxy having 1 to 7 carbon atoms, alkenyl having 2 to 7 carbon atoms, or alkenyloxy having 2 to 7 carbon atoms, and Z$^{41}$, Z$^{42}$ and Z$^{43}$ are each, independently of one another, —CH$_2$CH$_2$—, —CH=CH—, —COO— or a single bond,

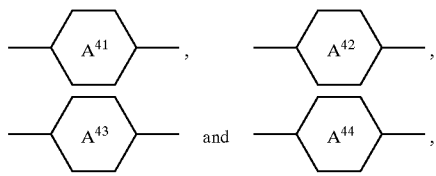

are each, independently of one another,

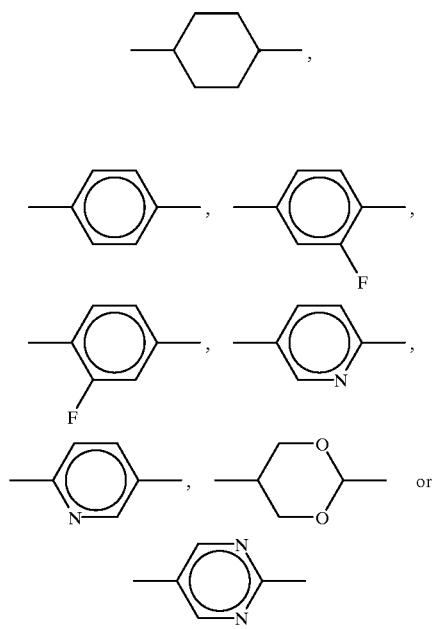

and o and p, independently of one another, are 0 or 1.

17. A liquid-crystal medium according to claim 16, wherein said medium contains one or more compounds of formulae IV1 to IV3:

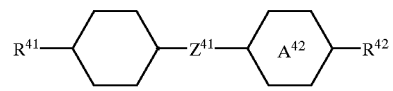

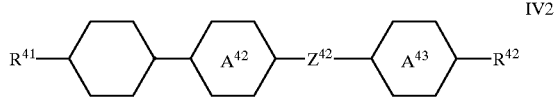

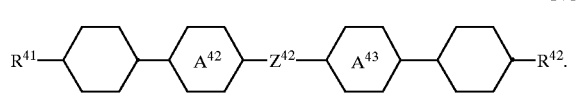

18. A liquid-crystal medium according to claim 16, wherein said medium contains one or more compounds of formula IV1a to IV1d, IV2a to IV2e, IV3a to IV3c and IV4a:

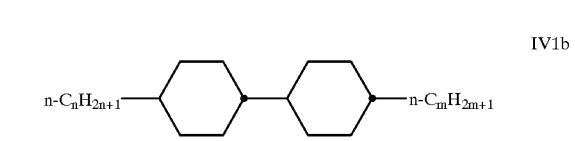

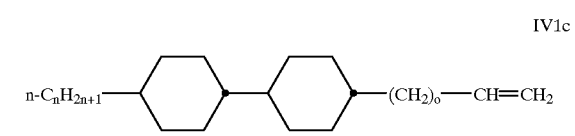

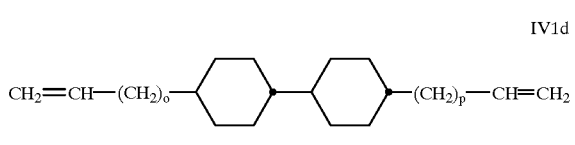

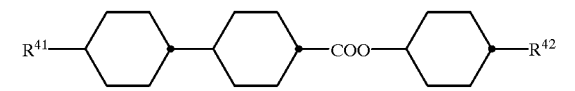

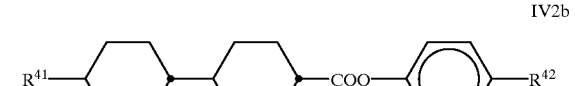

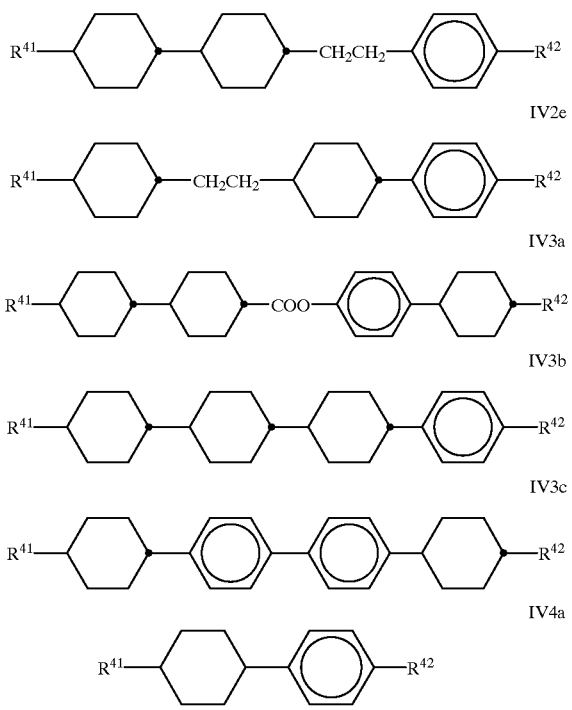

10%–40% of compounds of the formula I,

50%–90% of compounds of the formula II and

0%–40% of compounds of the formula III.

21. A liquid crystal medium according to claim 20, wherein said medium contains 15%–35% of compounds of the formula I, 60%–80% of compounds of the formula II and 0%–4 5% of compounds of the formula III.

22. In an electro-optical display containing a liquid-crystal medium, the improvement wherein said display contains a medium according to claim 1.

23. A display according to claim 22, wherein said display is an active matrix display.

24. An electro-optical display according to claim 23, wherein the display is an ECB or a VAN display.

25. In a method of generating an electro-optical effect using an electro-optical display, the improvement wherein a display according to claim 22 is used to generate said effect.

26. An electro-optical display according to claim 22, wherein the display is an ECB or a VAN display.

27. A liquid crystal medium according to claim 1, wherein said medium contains one or more dielectrically positive compound(s) of formula V

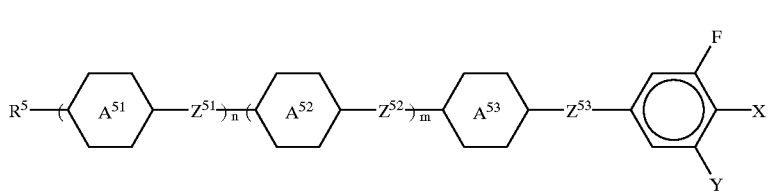

in which n and m are each, independently of one another, from 1 to 5, and o and p are each, both independently thereof and independently of one another, from 0 to 3, and the phenyl rings may optionally be fluorinated, but not in such a way that the compounds are identical to those of formula II.

19. A liquid-crystal medium according to claim 1, wherein said medium contains 5%–80% of compounds of the formula I, 5%–90% of compounds of the formula II, and 0%–40% of compounds of the formula III.

20. A liquid-crystal medium according to claim 19, wherein said medium contains:

in which $R^5$ is alkyl having 1 to 7 carbon atoms, alkoxy having 1 to 7 carbon atoms, alkoxyalkyl having 2 to 7 carbon atoms, alkenyl having 2 to 7 carbon atoms or alkenyloxy having 2 to 7 carbon atoms, $Z^{51}$, $Z^{52}$ and $Z^{53}$ are each, independently of one another, —CH$_2$—CH$_2$—, —CH=CH—, —C≡C—, —COO— or a single bond,

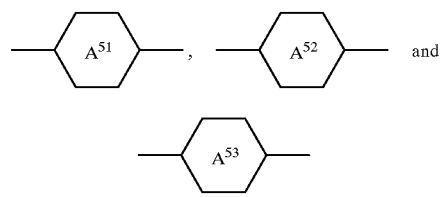

are each, independently of one another,

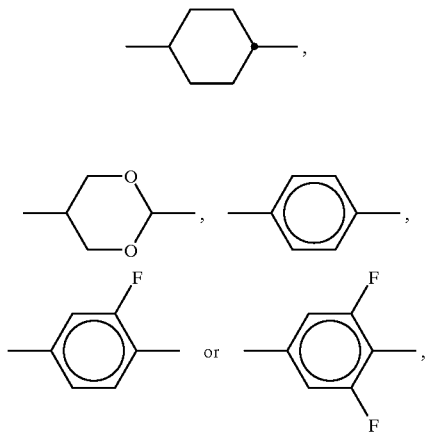

X is F, OCF$_2$H or OCF$_3$,
Y is H or F, and
n and m are each, independently of one another, 0 or 1.

28. A liquid-crystal medium according to claim 27, wherein said medium contains one or more compounds of formulae V1 to V4:

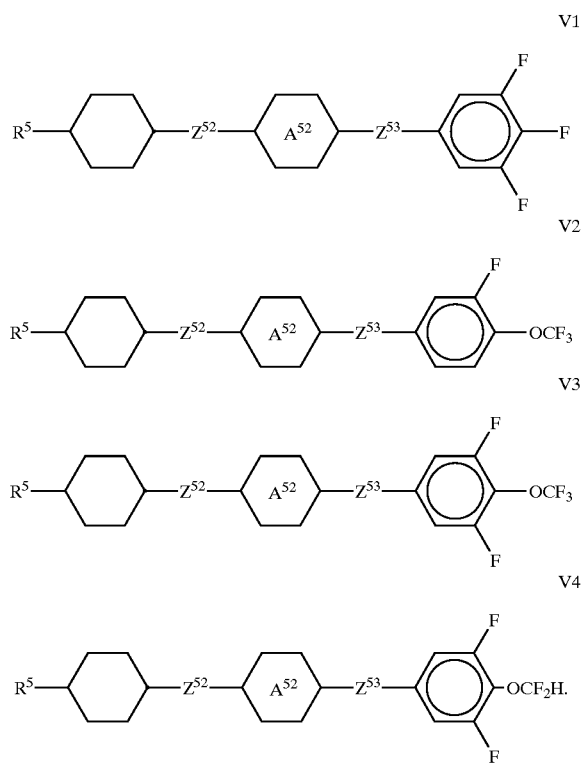

29. A liquid-crystal medium according to claim 1, wherein said medium contains one or more compounds of formula II1

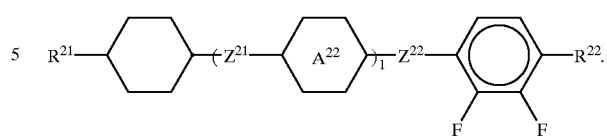

30. A liquid-crystal medium according to claim 29, wherein said medium contains one or more compounds of formulae II1a to II1e

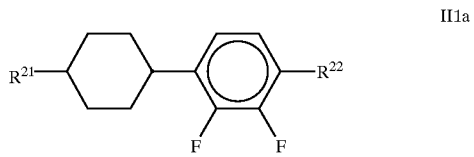

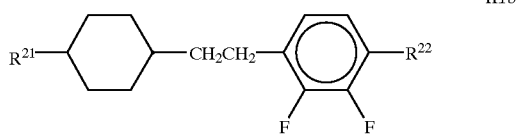

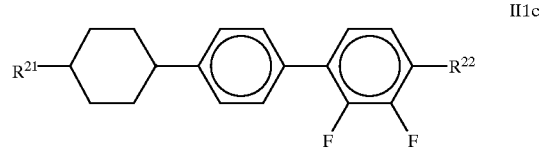

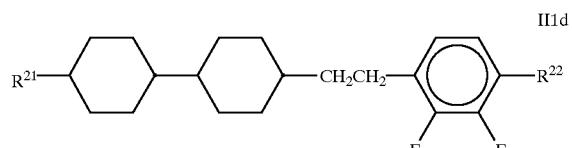

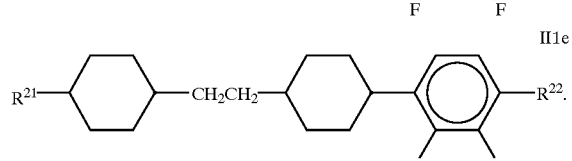

31. A liquid-crystal medium according to claim 1, wherein said medium exhibits a nematic phase at −30° C. to 70° C.

32. A liquid-crystal medium according to claim 1, wherein said medium has a birefringence value of 0.070 to 0.120.

33. A liquid-crystal medium according to claim 1, where said medium has a threshold voltage value of ≦2.0V.

34. A medium according to claim 1, wherein the medium has a Δn≧0.090.

35. A medium according to claim 1, wherein the medium has a Δn≧0.100.

* * * * *